(12) United States Patent
Wittman et al.

(10) Patent No.: US 10,589,869 B2
(45) Date of Patent: Mar. 17, 2020

(54) NACELLE INLET LIP FUSE STRUCTURE

(71) Applicant: MRA Systems, LLC, Baltimore, MD (US)

(72) Inventors: Paul C. Wittman, Glen Arm, MD (US); Dongming Dominic Gao, Glenelg, MD (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 16/116,506

(22) Filed: Aug. 29, 2018

(65) Prior Publication Data
US 2020/0031487 A1    Jan. 30, 2020

Related U.S. Application Data

(60) Provisional application No. 62/703,414, filed on Jul. 25, 2018.

(51) Int. Cl.
*F02C 7/05* (2006.01)
*B64D 33/02* (2006.01)
*B64D 29/00* (2006.01)

(52) U.S. Cl.
CPC ............. *B64D 33/02* (2013.01); *B64D 29/00* (2013.01); *F02C 7/05* (2013.01); *B64D 2033/022* (2013.01); *B64D 2033/0286* (2013.01)

(58) Field of Classification Search
None
See application file for complete search history.

(56) References Cited

U.S. PATENT DOCUMENTS

| 4,713,934 A | 12/1987 | Pellow |
| 5,205,513 A | 4/1993 | Schilling |
| 5,259,724 A | 11/1993 | Liston et al. |
| 5,941,061 A * | 8/1999 | Sherry ................ B64D 29/08 244/54 |
| 6,360,989 B1 | 3/2002 | Maguire |
| 7,318,685 B2 | 1/2008 | Bouchy et al. |
| 8,567,712 B2 | 10/2013 | Porte et al. |
| 8,968,437 B2 | 3/2015 | Kline |
| 8,979,020 B2 | 3/2015 | Badescu et al. |
| 9,810,096 B2 | 11/2017 | Evans et al. |
| 2005/0022866 A1 * | 2/2005 | Sakurai ................ B64D 33/02 137/15.1 |
| 2011/0162429 A1 * | 7/2011 | Leacock ................ B21D 25/02 72/296 |

(Continued)

*Primary Examiner* — Michael Lebentritt
(74) *Attorney, Agent, or Firm* — General Electric; Pamela Kachur

(57) ABSTRACT

An inlet lip structure includes: an annular inner barrel with forward and aft ends; an annular outer barrel with forward and aft ends; an annular aft bulkhead interconnecting the aft ends of the inner and outer barrels; an annular forward bulkhead interconnecting the forward ends of the inner and outer barrels; an annular lip skin interconnecting the forward ends of the inner and outer barrels, the lip skin having a C-shaped cross-section comprising a nose with inner and outer legs extending therefrom, the lip skin having opposed inner and outer surfaces; and wherein the outer leg of the lip skin incorporates a fuse element having an ultimate strength which is lower than an ultimate strength of the remainder of the lip skin.

20 Claims, 4 Drawing Sheets

(56) References Cited

U.S. PATENT DOCUMENTS

| | | | |
|---|---|---|---|
| 2012/0076635 A1* | 3/2012 | Atassi | B64D 33/02 415/1 |
| 2015/0129045 A1* | 5/2015 | Kane | B64D 33/02 137/15.1 |
| 2016/0024963 A1* | 1/2016 | Lumbab | B64D 33/02 415/119 |
| 2016/0040595 A1* | 2/2016 | Devine | F02C 7/042 415/2.1 |
| 2016/0114898 A1* | 4/2016 | Llamas Castro | B64D 33/02 415/177 |
| 2016/0251085 A1* | 9/2016 | Stark | B64D 29/06 244/53 R |
| 2017/0001730 A1* | 1/2017 | Namgoong | B64D 29/00 |
| 2017/0184023 A1* | 6/2017 | Desjoyeaux | B64D 33/02 |
| 2017/0233090 A1* | 8/2017 | Crawford | B64D 33/02 415/220 |
| 2017/0363062 A1 | 12/2017 | Merzhaeuser et al. | |
| 2018/0079514 A1* | 3/2018 | Ramakrishnan | B64D 27/20 |
| 2018/0100434 A1* | 4/2018 | Dindar | B64D 33/02 |
| 2018/0105281 A1* | 4/2018 | Porte | B64D 29/00 |
| 2018/0194485 A1* | 7/2018 | Chilukuri | B64D 15/04 |
| 2018/0230949 A1* | 8/2018 | Kerbler | F02K 3/06 |
| 2018/0283203 A1* | 10/2018 | Manepalli | F01D 21/02 |
| 2018/0283276 A1* | 10/2018 | Todorovic | F02C 7/28 |
| 2018/0334249 A1* | 11/2018 | Binks | B64D 29/00 |
| 2018/0362178 A1* | 12/2018 | Bottero | B64F 5/10 |
| 2019/0093557 A1* | 3/2019 | Thomas | F02C 7/045 |
| 2019/0118957 A1* | 4/2019 | Thomassin | B64D 27/24 |
| 2019/0153612 A1* | 5/2019 | Labrecque | C25D 21/10 |
| 2019/0161199 A1* | 5/2019 | Lacko | B64D 33/06 |
| 2019/0193833 A1* | 6/2019 | Vinches | B64D 29/06 |
| 2019/0226402 A1* | 7/2019 | Kray | F02C 7/047 |
| 2019/0234242 A1* | 8/2019 | Ramakrishnan | B64C 30/00 |
| 2019/0291885 A1* | 9/2019 | Negulescu | B64D 33/02 |
| 2019/0308737 A1* | 10/2019 | Porte | H05B 3/0019 |

* cited by examiner 10,589,869 B2

1

NACELLE INLET LIP FUSE STRUCTURE

BACKGROUND OF THE INVENTION

This invention relates generally to aerospace leading edge structures, and more particularly relates to nacelle leading edges in gas turbine engines.

A gas turbine engine includes, in serial flow communication, a compressor, a combustor, and turbine. The turbine is mechanically coupled to the compressor and the three components define a turbomachinery core. The core is operable in a known manner to generate a flow of hot, pressurized combustion gases to operate the engine as well as perform useful work such as providing propulsive thrust or mechanical work. A turbofan engine adds to this basic structure a fan and a low-pressure turbine system to drive the fan, to produce additional propulsive thrust.

In aircraft usage, a gas turbine engine is frequently mounted with a nacelle which encloses the engine, provides a streamlined flowpath over the exterior of the engine, and defines an inlet and outlet for airflow through the engine.

Nacelle inlets are required to resist bird strikes and prevent bird penetration into internal cavities of the nacelle. One problem with prior art nacelle inlet designs is that they may be subject to failure mode from bird strikes that would require undesirable increase in the strength and weight of the component parts.

BRIEF DESCRIPTION OF THE INVENTION

This problem is addressed by a lip skin having a fuse element which forces lip skin failure when impacted by a bird.

According to one aspect of the technology described herein, an inlet lip structure includes: an annular inner barrel with forward and aft ends; an annular outer barrel with forward and aft ends; an annular aft bulkhead interconnecting the aft ends of the inner and outer barrels; an annular forward bulkhead interconnecting the forward ends of the inner and outer barrels; an annular lip skin interconnecting the forward ends of the inner and outer barrels, the lip skin having a C-shaped cross-section comprising a nose with inner and outer legs extending therefrom, the lip skin having opposed inner and outer surfaces; and wherein the outer leg of the lip skin incorporates a fuse element having an ultimate strength which is lower than an ultimate strength of the remainder of the lip skin.

According to another aspect of the technology described herein, a gas turbine engine includes: a turbomachinery core operable to produce a flow of combustion gases; a nacelle surrounding the turbomachinery core, the nacelle having an inlet lip structure which includes: an annular inner barrel with forward and aft ends; an annular outer barrel with forward and aft ends; an annular aft bulkhead interconnecting the aft ends of the inner and outer barrels; an annular forward bulkhead interconnecting the forward ends of the inner and outer barrels; an annular lip skin interconnecting the forward ends of the inner and outer barrels, the lip skin having a C-shaped cross-section comprising a nose with inner and outer legs extending therefrom, the lip skin having opposed inner and outer surfaces; and wherein the outer leg of the lip skin incorporates a fuse element having an ultimate strength which is lower than an ultimate strength of the remainder of the lip skin.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
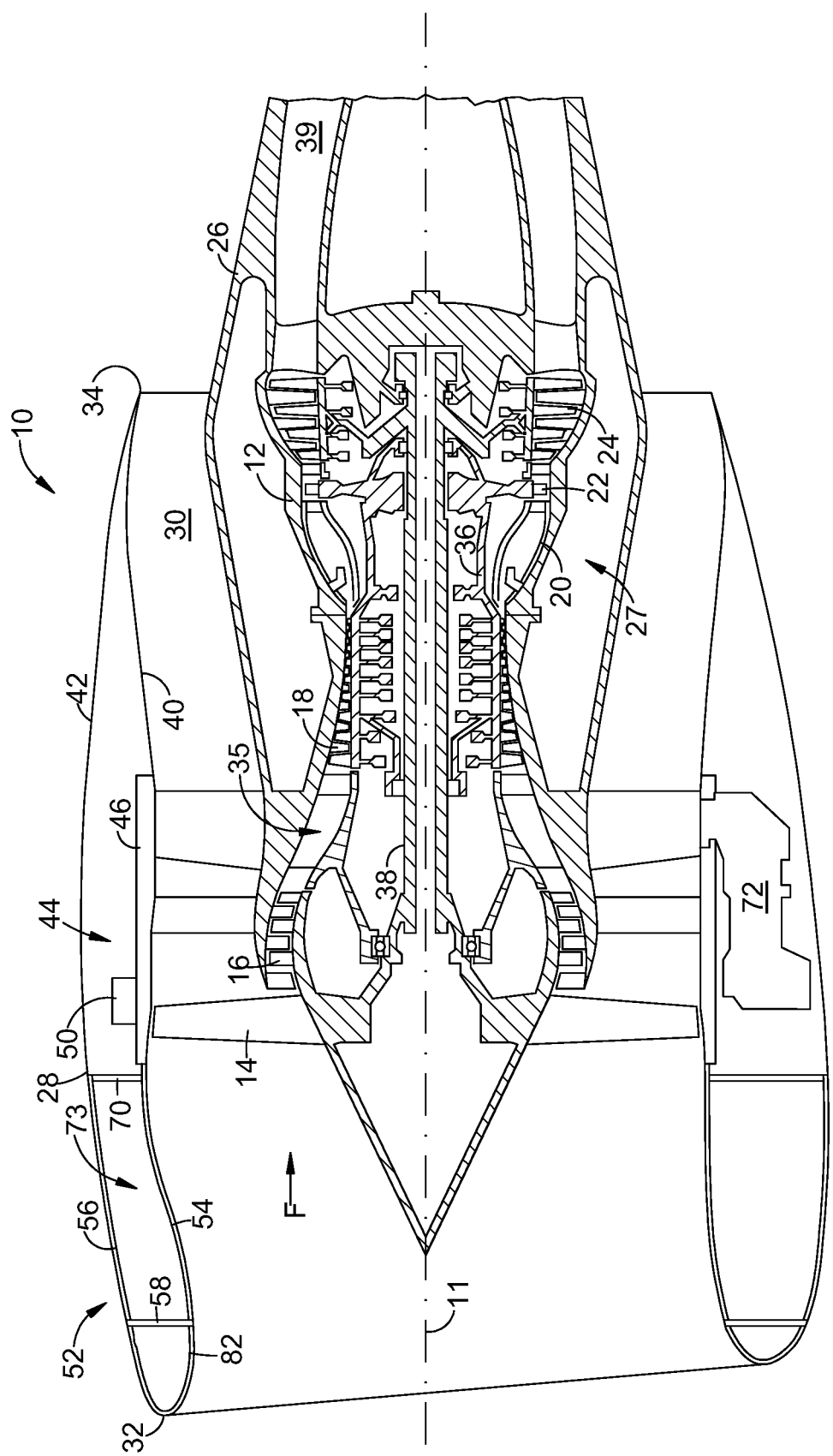
FIG. 1 is a cross-sectional, schematic view of a gas turbine engine that incorporates a nacelle with an inlet lip fuse structure.

Referring to the drawings wherein identical reference numerals denote the same elements throughout the various views, FIG. 1 depicts an exemplary gas turbine engine 10 incorporating a nacelle with an inlet lip structure having a fuse element. While the illustrated example is a high-bypass turbofan engine, the principles of the present invention are also applicable to other types of engines, such as low-bypass turbofans, turbojets, stationary gas turbines, etc. the principles of the present invention are further applicable to other lip structures such as aircraft wing leading edges or aircraft control surface leading edges.

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 has a fan 14, low-pressure compressor or booster 16, high-pressure compressor or "HPC" 18, combustor 20, high-pressure turbine or "HPT" 22, and low-pressure turbine or "LPT" 24 arranged in serial flow relationship.

The HPC 18, combustor 20, and HPT 22 collectively define a core of the engine 10. The fan 14, booster 16, and LPT 24 collectively define a low-pressure system of the engine 10.

An annular core nacelle 26 surrounds the engine core as well as the booster 16. The term "annular" is used herein consistent with its common definition meaning "ring-shaped". The term "annular" as used herein does not necessarily imply that the structure referred to is axisymmetric or a body of revolution. The core nacelle 26 may alternatively be referred to as a "cowl" and the space between a core casing 12 and the core nacelle 26 may be referred as an "under-cowl area" 27 of the engine 10. A fan nacelle 28 surrounds the core nacelle 26 and the fan 14. The core nacelle 26 is spaced-away from the fan nacelle 28 and a fan duct 30 is defined in the space between the two nacelles. The fan duct 30 communicates with an engine inlet 32 at its upstream end and a fan nozzle 34 at its downstream end.

The stationary and rotating components of the engine 10 collectively define a primary flowpath 35 which extends from the booster 16, through the HPC 18, combustor 20, HPT 22, and LPT 24, to a core nozzle 39. The primary flowpath 35 is distinct from a bypass flowpath passing through the engine inlet 32 through the fan 14, fan duct 30 and fan nozzle 34.

In operation, pressurized air from the compressor 18 is mixed with fuel in the combustor 20 and ignited, thereby generating combustion gases. Some work is extracted from these gases by the high-pressure turbine 22 which drives the compressor 18 via an outer shaft 36. The combustion gases then flow into the low-pressure turbine 24, which drives the fan 14 and booster 16 via an inner shaft 38.

The fan nacelle 28 is a generally annular structure, with an inner wall 40 that defines a portion of the engine inlet 32 and fan duct 30, and an outer wall 42 spaced away from the inner wall 40 to define a hollow interior space. A portion of this space which overlaps the axial position of the fan 14 is designated a "fan compartment" 44. The fan compartment 44 encloses a fan casing 46. The fan compartment 44 may also enclose other structures such as accessory gearboxes 72, electronic controls 50 (e.g. FADEC units), electrical conductors, and/or fluid lines (e.g., fuel, oil, and/or air). These have the common feature of being electrical or fluid-containing components. These are referred to generally as "damage-sensitive equipment".

The fan nacelle 28 includes a lip structure 52 disposed at the forward end and defining the inlet 32.

Figure 2:
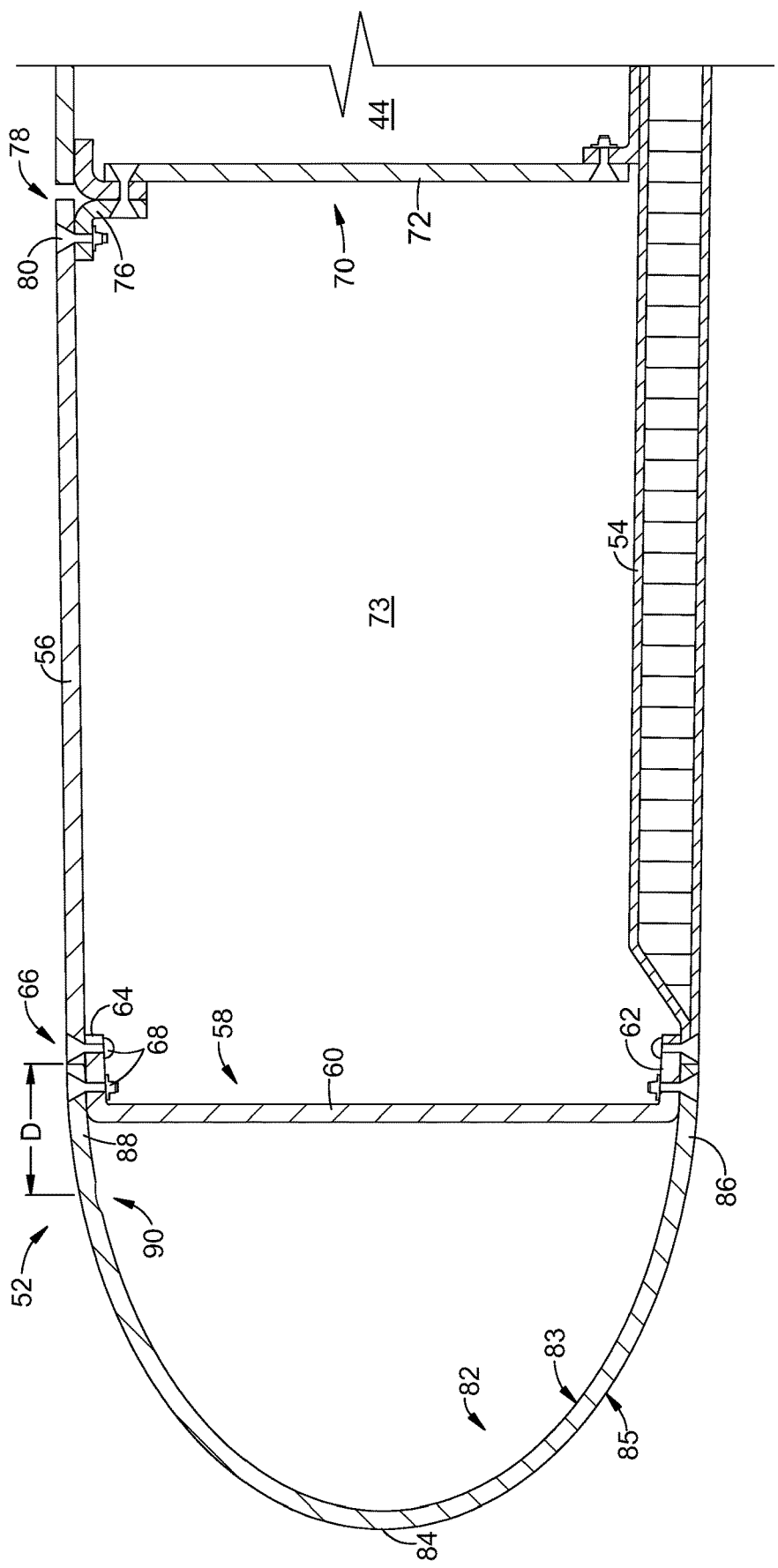
FIG. 2 is a schematic, half-sectional view of a portion of an inlet lip structure of the engine of FIG. 1.

FIG. 2 shows the construction of the lip structure 52 in more detail. The lip structure 52 is an annular structure built up from smaller components. It includes an annular inner barrel 54 having forward and aft ends, surrounded by an annular outer barrel 56 having forward and aft ends. The outer barrel 56 is a relatively thin, wall-like structure, and may be formed from materials such as metal alloys or nonmetallic composites. The inner barrel 54 is an acoustically treated bondment with relatively thin skins and core. The skins may be formed from materials such as metal alloys or nonmetallic composites and core may be formed from materials such as NOMEX, fiberglass or aluminum. The inner and outer barrels 54, 56 are interconnected at their forward ends by an annular forward bulkhead 58, the surface of which faces in a generally axial direction. The forward bulkhead 58 is a wall-like structure and may be formed from a material such as a metal alloy or nonmetallic composite. For example, titanium alloys, nickel-based alloys (e.g., INCONEL), or aluminum alloys are commonly used for this purpose. The forward bulkhead 58 has a web 60 with inner and outer flanges 62, 64. The flanges 62, 64 may be formed integrally with the web 60. Alternatively, one or both of the flanges 62, 64 may be formed separately and attached to the web 60, for example using adhesives, welding, or mechanical fasteners such as rivets or bolts. In a typical construction, the outer flange 64 may be attached to the outer barrel 56 at a forward outer joint 66, for example using adhesives or mechanical fasteners 68 such as rivets or bolts.

The inner and outer barrels 54, 56 are interconnected at their aft ends by an annular aft bulkhead 70, the surface of which faces in a generally axial direction. The aft bulkhead 70 is a wall-like structure and may be formed from a material such as a metal alloy or nonmetallic composite. For example, titanium alloys, nickel-based alloys (e.g., INCONEL), or aluminum alloys are commonly used for this purpose. The aft bulkhead 70 has a web 72 with an outer flange 76. The outer flange 76 may be formed integrally with the web 72. Alternatively, the flange 76 may be formed separately and attached to the web 72, for example using adhesives, welding, or mechanical fasteners such as rivets or bolts. In a typical construction, the outer flange 76 may be attached to the outer barrel 56 at an aft outer joint 78, for example using adhesives or mechanical fasteners 80 such as rivets or bolts. Collectively, the inner and outer barrel 54, 56, the forward bulkhead 58, and the aft bulkhead 70 define an enclose a hollow space referred to as an inlet cavity 73.

The aft bulkhead 70 forms a demarcation between the lip structure 52 and the fan compartment 44. Stated another way, it is the aft-most element of the lip structure 52 and it is the forward-most element of the fan compartment 44.

The inner and outer barrels 54, 56 are also interconnected at their forward ends by an annular lip skin 82 having opposed inner and outer surfaces 83, 85 respectively. This is a structure having a generally convex cross-sectional shape which may be referred to as "C-shaped" or "U-shaped" or "V-shaped". The shape may be described as having a "nose" 84 and inner and outer "legs" 86, 88. The inner leg 86 may be connected to the forward end of the inner barrel 54 and the inner flange 62 of the forward bulkhead 58 in a common joint. The outer leg 88 may be connected to the forward end of the outer barrel 56 and the outer flange 64 at a common joint (e.g. forward outer joint 66). The nose 84 defines the aerodynamic leading edge of the engine inlet 32. The lip skin 82 is a wall-like structure and may be formed from a material such as a metal alloy or nonmetallic composite. For example, aluminum alloys are commonly used for this purpose.

In flight, the engine 10 and in particular the lip structure 52 may be subject to impact of foreign object debris ("FOD"). For example, the lip structure 52 may be subject to bird impacts, commonly referred to as "birdstrikes". For practical and regulatory reasons, damage from FOD must be limited to prevent interference with operation of the engine 10. In particular, is important that debris not be allowed to penetrate the aft bulkhead 70, because damage-sensitive equipment may be located in the fan compartment 44. Damage to this equipment, for example a FADEC unit or a fuel line, can cause the engine 10 to fail or may start a fire.

Analysis has shown that under some circumstances a bird impacting the lip skin 10, without causing the lip skin 82 to fail, might penetrate the aft bulkhead 70. For example, the bird may slide up the outer leg 88 of the lip skin 82 and enter the inlet cavity 73 at the forward outer joint 66 between the outer barrel 56 and the forward bulkhead 58. It is noted that the central portions of the forward and aft bulkheads 58, 70 are capable of generally accepting higher levels of impact energy without failing, and/or are capable of absorbing higher levels of impact energy during a failure, as compared to the joints 66, 78 between the bulkheads and the barrels.

Subsequent to entering the inlet cavity 73, the bird can impact the aft bulkhead 70 near the aft outer joint 78 between the outer barrel 56 and the aft bulkhead 70. Bird kinetic energy is retained due to passage through the relatively weaker joint areas as opposed to directly through the bulkheads. This can lead to the bird entering the fan compartment 44.

In order to avoid the type of failure described above, the lip skin 82, particularly the outer leg 88, may incorporate a fuse element, indicated generally at 90 in FIG. 2. The fuse element 90 is selected to introduce a predetermined location of weakness relative to the remainder of the lip skin 82. Stated another way, the fuse element 90 is configured to fail at a predetermined load lower than a basic load capability of the remainder of the lip skin 82. Stated yet another way, the fuse element 90 has an ultimate strength less than an ultimate strength of the remainder of the lip skin 82.

The introduction of the fuse element 90 forces lip skin failure in the case of bird impact and allows for directed targeting of a bird onto forward and aft bulkheads allowing for bird trajectory that optimizes bird resistance in the most cost and weight efficient manner. The fuse element 90 is placed in a predetermined location which will permit a bird or other similar mass to avoid the joints 66, 78 and to impact more towards the center of the web 60 of the forward bulkhead 58 and the web 72 of the aft bulkhead 70. In practice, the enhanced energy absorption provided by the webs 60, 72 may prevent the aft bulkhead 70 from being penetrated by a birdstrike, without having to introduce any additional components or increase the mass of many components of the lip structure. The location of the fuse element 90 may be characterized by its axial location forward of the forward outer joint 66, labeled "D". The distance D may be determined for a specific application by testing or analysis. In the illustrated example, the fuse element 90 is a 360° annular structure, but this may be altered to suit a specific application.

Figure 3:
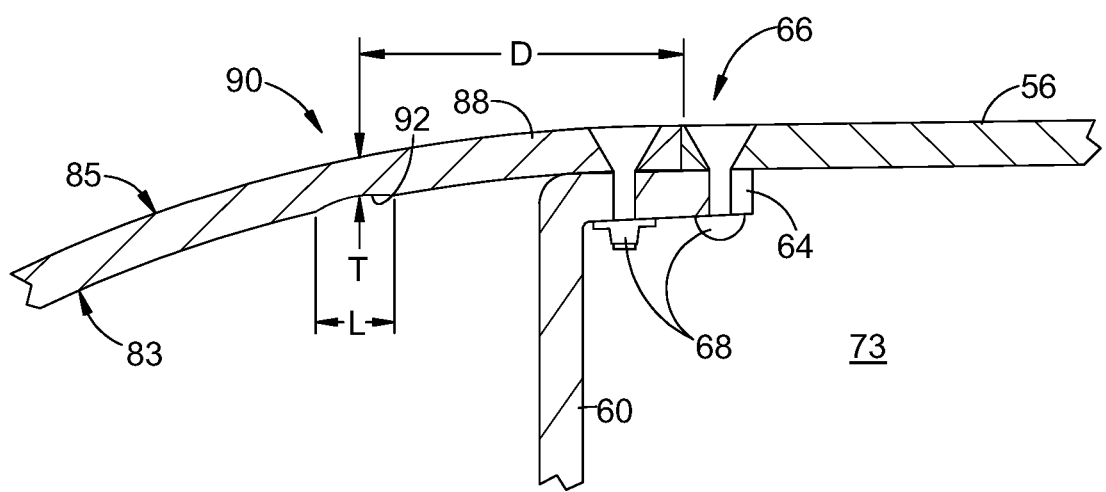
FIG. 3 is an enlarged view of a portion of FIG. 2, showing a first embodiment of the fuse element.

FIG. 3 illustrates one exemplary embodiment of a fuse element 90. This takes the form of an undercut 92 formed in the inner surface 83 of the outer leg 88. In the illustrated example, the undercut 92 is formed as a 360° groove with a predetermined axial length "L", and the outer leg 88 has a predetermined thickness "T" remaining in the undercut 92, less than the thickness of the remainder of the outer leg 88. The shape and dimensions of the undercut 92 may be selected so as to permit the lip skin 82 to fail when impacted by a bird or other similar mass, but to retain its structural integrity when experiencing lesser impacts such as hail. The shape may incorporate radii or blends to avoid stress risers.

Figure 4:
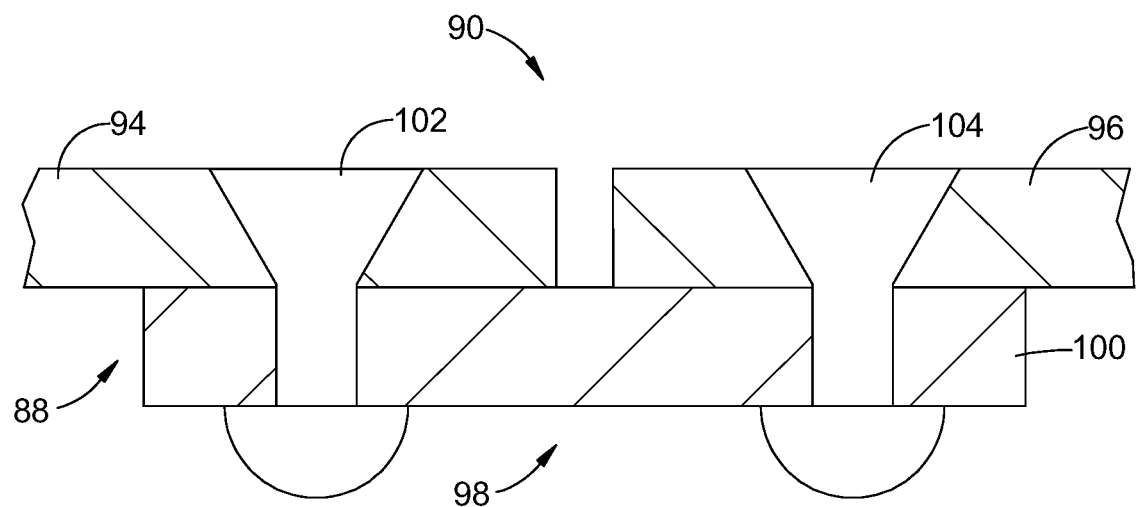
FIG. 4 is a schematic sectional view of a portion of a lip skin, showing an alternative embodiment of the fuse element.

FIG. 4 illustrates an alternative embodiment of a fuse element 90 in which the outer leg 88 of the lip skin 82 is provided as two sections 94, 96 which are joined at an annular butt joint 98 by an annular splicing strap 100. The splicing strap 98 is joined to the first section 94 at a first joint 102 and the second section 96 at a second joint 104. The joints 102, 104 may be implemented using adhesives, welding, or mechanical fasteners, such as rivets or bolts. The properties of the connection between the sections 94, 96 may be selected to provide a predetermined relative weakness as described above. This may be done by some combination of the selection of the type of joint 102, 104, the materials and dimensions of the sections 94, 96, and the materials and dimensions of the splicing strap 100.

Figure 5:
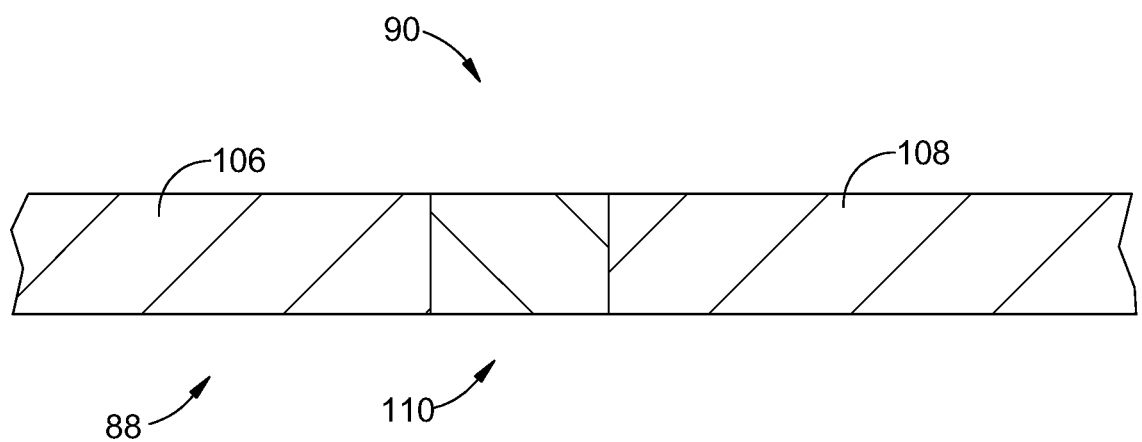
FIG. 5 is a schematic sectional view of a portion of lip skin, showing another alternative embodiment of a lip skin.

FIG. 5 illustrates yet another alternative embodiment of a fuse element 90 in which the outer leg 88 of the lip skin 82 is provided as two sections 106, 108 which are joined at an annular butt joint by an integral bond 110. In one example, the integral bond may comprise a weld joint between the two sections 106, 108. In another example, the integral bond may comprise a filler piece disposed between the two sections 106, 108 and joined to the sections 106, 108 by bonds such as adhesive or welding. The properties of the integral bond between the sections 106, 108 may be selected to provide a predetermined relative weakness as described above. This may be done by some combination of the selection of the type of joint (e.g. direct welding versus a filler piece) and the materials and dimensions of the integral bond 110 (e.g. weld size, filler alloy, etc.).

The nacelle lip structure described herein has advantages over the prior art. Analysis has shown it can significantly reduce the chance of failure of the aft bulkhead 70, without requiring undesirable weight increase of the components of the nose structure. The introduction of the fuse element forces lip skin failure and allows for directed targeting of bird onto forward and aft bulkheads allowing for bird trajectory that optimizes bird resistance in the most cost and weight efficient manner.

The foregoing has described an inlet lip structure incorporating a fuse element. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. An inlet lip structure, comprising:
an annular inner barrel with forward and aft ends;
an annular outer barrel with forward and aft ends;
an annular aft bulkhead interconnecting the aft ends of the inner and outer barrels;
an annular forward bulkhead interconnecting the forward ends of the inner and outer barrels;
an annular lip skin interconnecting the forward ends of the inner and outer barrels, the lip skin having a C-shaped cross-section comprising a nose with inner and outer legs extending therefrom, the lip skin having opposed inner and outer surfaces; and
wherein the outer leg of the lip skin incorporates a fuse element having an ultimate strength which is lower than an ultimate strength of the remainder of the lip skin.

2. The inlet lip structure of claim 1, wherein the inner and outer barrel, the forward bulkhead, and the aft bulkhead collectively define an inlet cavity.

3. The inlet lip structure of claim 1 wherein the forward bulkhead includes an outer flange which is attached to the outer barrel at a forward outer joint.

4. The inlet lip structure of claim 3 wherein the forward outer joint includes a plurality of mechanical fasteners.

5. The inlet lip structure of claim 1 wherein the aft bulkhead includes an outer flange which is attached to the outer barrel at an aft outer joint.

6. The inlet lip structure of claim 5 wherein the aft outer joint includes a plurality of mechanical fasteners.

7. The inlet lip structure of claim 1, wherein the lip skin comprises a metal alloy.

8. The inlet lip structure of claim 1, wherein the fuse element comprises an undercut formed in the inner face of the outer leg.

9. The inlet lip structure of claim 8, wherein the outer leg has a predetermined thickness remaining in the undercut less than a thickness of the remainder of the outer leg.

10. The inlet lip structure of claim 1, wherein the outer leg of the lip skin is provided as two sections which are joined at an annular butt joint by a splicing strap.

11. The inlet lip structure of claim 10 wherein the splicing strap is joined to the first section with a first plurality of mechanical fasteners at a first joint, and the splicing strap is joined to the second section with a second plurality of mechanical fasteners at a second joint.

12. The inlet lip structure of claim 1, wherein the outer leg of the lip skin is provided as two sections which are joined at an annular butt joint by an integral bond.

13. The inlet lip structure of claim 12, wherein the integral bond comprises a weld joint between the two sections.

14. The inlet lip structure of claim 1, wherein the outer leg of the lip skin is provided as two sections with a filler piece disposed therebetween, wherein each of the two sections is joined to the filler piece by an integral bond.

15. A gas turbine engine, comprising:
- a turbomachinery core operable to produce a flow of combustion gases;
- a nacelle surrounding the turbomachinery core, the nacelle having an inlet lip structure which includes:
    an annular inner barrel with forward and aft ends;
    an annular outer barrel with forward and aft ends;
    an annular aft bulkhead interconnecting the aft ends of the inner and outer barrels;
    an annular forward bulkhead interconnecting the forward ends of the inner and outer barrels;
    an annular lip skin interconnecting the forward ends of the inner and outer barrels, the lip skin having a C-shaped cross-section comprising a nose with inner and outer legs extending therefrom, the lip skin having opposed inner and outer surfaces; and
    wherein the outer leg of the lip skin incorporates a fuse element having an ultimate strength which is lower than an ultimate strength of the remainder of the lip skin.

16. The gas turbine engine of claim 15, further including a rotatable fan disposed inside the nacelle.

17. The gas turbine engine of claim 16, wherein:
the nacelle includes an inner wall and an outer wall spaced away from the inner wall to define a hollow fan compartment which overlaps the axial position of the fan;
the inlet lip structure is disposed axially adjacent the fan compartment and is separated from the separate from the inlet lip structure by the aft bulkhead.

18. The gas turbine engine of claim 17, wherein at least one electrical or fluid-containing component is located in the fan compartment.

19. The inlet lip structure of claim 15 wherein:
the forward bulkhead includes an outer flange which is attached to the outer barrel at a forward outer joint; and
the aft bulkhead includes an outer flange which is attached to the outer barrel at an aft outer joint.

20. The inlet lip structure of claim 15, wherein the fuse element comprises an undercut formed in the inner surface of the outer leg.

* * * * *